United States Patent [19]
Murphy

[11] Patent Number: 5,046,281
[45] Date of Patent: Sep. 10, 1991

[54] TREE DOSING APPARATUS

[75] Inventor: Allan P. Murphy, Dubbo, Australia

[73] Assignee: N. J. Phillips Pty. Limited

[21] Appl. No.: 375,577

[22] Filed: Jul. 5, 1989

Related U.S. Application Data

[63] Continuation of Ser. No. 183,189, Feb. 5, 1988, abandoned.

[30] Foreign Application Priority Data

Jun. 5, 1986 [AU] Australia .................. PH06264

[51] Int. Cl.⁵ .............................................. A01G 29/00
[52] U.S. Cl. ...................................................... 47/57.5
[58] Field of Search ........................................ 47/57.5

[56] References Cited

U.S. PATENT DOCUMENTS

| | | | |
|---|---|---|---|
| 2,309,391 | 1/1943 | Hecht | 47/57.5 |
| 2,747,330 | 6/1956 | Simpkins | 47/57.5 X |
| 2,803,924 | 8/1957 | Little | 47/57.5 |
| 2,821,944 | 2/1958 | Blake | 47/57.5 X |
| 2,885,121 | 6/1959 | Littleton | 47/57.5 |
| 3,136,091 | 6/1964 | Phelps | 47/57.5 |
| 3,461,588 | 8/1969 | Johnson | 47/57.5 X |
| 3,596,402 | 8/1971 | Palmer | 47/53 |
| 4,090,326 | 5/1978 | Crowson | 47/57.5 X |
| 4,596,088 | 6/1986 | Graber | 47/57.5 |
| 4,821,683 | 4/1989 | Veldman | |
| 4,905,634 | 3/1990 | Veldman | |

FOREIGN PATENT DOCUMENTS

| | | |
|---|---|---|
| 3687878 | of 1978 | Australia . |
| 2511839 | 3/1983 | France . |
| 203923 | 8/1986 | New Zealand . |
| 203924 | 8/1986 | New Zealand . |
| 744375 | 2/1956 | United Kingdom ................. 47/57.5 |
| 8707473 | 6/1986 | World Int. Prop. O. . |

OTHER PUBLICATIONS

Dow Chemical, "Down to Earth" vol. 6, No. 3, 1950.

Primary Examiner—Richard E. Chilcot, Jr.
Assistant Examiner—Joanne C. Downs
Attorney, Agent, or Firm—Darby & Darby

[57] ABSTRACT

An attachment 1 for a hand gun 2 with a movable piston 4 actuated by a trigger means 11, which comprises a blade 3 to form a cut in a tree, and a fluid injection means 10 which instantaneously supplies a fluid dosage to the cut. The fuel to operate the hand gun 2, together with the fluid, are preferably provided in a backpack 43.

13 Claims, 3 Drawing Sheets

TREE DOSING APPARATUS

This is a continuation of application Ser. No. 183,189, filed Feb. 5, 1988, now abandoned.

The present invention relates to a tree dosing apparatus, and in Particular to an apparatus which applies a cut to a tree, and which then supplies a chemical to said cut.

Tree injection is the operation of making a cut in a tree and then placing a dose of chemical into said cut. Presently, there are several known methods by which a cut may be made in a tree. Generally, a cut is made manually by means of a spear, an axe, or by other specially shaped hand tools. The cut must be of such shape and angle to allow the then introduced chemical to remain in the cut whilst the tree absorbs and transports the chemical throughout its leaf, branch and root system. After the cut was made, the chemical was then supplied to the cut by a second operation. Usually, a small hand operated innoculating syringe is utilised to inject the chemical into the cut. These prior art methods of tree injection therefore involved a two-step operation which was time consuming, and involves considerable manual effort. These prior art methods of tree injection sometimes require two men, one for each operation.

The time delay between making the cut into the tree and injection of the herbicide is most critical as trees have the ability to quickly seal up incisions protecting them from the entry of bacteria, etc.

The present invention disclosed makes the cut and injects the herbicide instantaneously, thus increasing the uptake of herbicide gives more effective and more ecomonical control. Most preceeding methods usually have time delay of over two seconds which reduce herbicide uptake.

The present invention seeks to overcome the prior art problems of tree injection, by providing a tree injection apparatus which allows a cut to be made in a tree, and a chemical to be supplied to said cut, by a one step operation.

Various alternative embodiments of the present invention are possible, which performs the tree cutting and injection operations. The preferred embodiments, as herein described with reference to FIGS. 1, 2 and 3, provide a hand gun connected to a backpack structure. The hand gun achieves the cutting and dosing operations, powered by a fuel source which is contained in the backpack structure, together with the dosing chemical. The preferred embodiments of the present invention utilise a tree injection attachment connected to any suitable fuel actuated piston type device. One such device, in the form of a hand gun, is disclosed in U.S. Pat. Nos. 4,821,683 and 4,905,634.

New Zealand Patent Application Nos. 203923 and 203924, both in the name of ALPHONSUS GERARDUS GULIELMUS VELDMAN and which are incorporated herein by reference, describe combustible fuel actuated piston type devices suitable for attachment to the tree injection apparatus of the present invention. The VELDMAN applications each disclose a hand operable portable power tool, comprising a combustion chamber provided with a movable piston therein. A trigger is activated to firstly admit fuel into the combustion chamber, then actuate an ignition means which ignites the fuel. Subsequent combustion of said fuel creates an elevated pressure within the chamber, causing rapid movement of the piston, thus providing the resultant impact drive of the disclosed devices.

As described in the VELDMAN Patent Application, there have been many other proposals for driving the work piston of a portable power tool. Such other devices are also suitable for attachment to the tree injection apparatus of the present invention.

In one broad form the present invention provides a tree dosing attachment for a device having a movable piston actuated by a trigger means, comprising:

a blade adapted to engage said piston at a first end thereof; and a fluid injection means in operable relationship with said trigger means;

such that, upon activation of said trigger means, said blade pierces a cut in a tree, and said fluid injection means supplies a fluid dosage to said cut.

In a further broad form the present invention provides a tree dosing apparatus comprising:

a hand gun having an expansible chamber with a movable piston at one end thereof, and a trigger means;

a blade adapted to engage said piston at a first end thereof; and a fluid injection means in operable relationship with said trigger means; wherein, upon activation of said trigger means, an explosive fuel is supplied to said chamber, and said fuel is ignited such that said piston is momentarily forced in a forward direction, such that said blade pierces a cut in a tree, and said fluid injection means supplies a fluid dosage to said cut.

The present invention will become more fully understood from the following detailed description of preferred embodiments thereof, in connection with the accompanying drawings, in which:

FIG. 5(b) shows an exploded plan side view of an LPG cylinder of FIG. 4, and FIG. 5(c) shows the backpack structure of FIG. 4 being carried.

Figure 1:
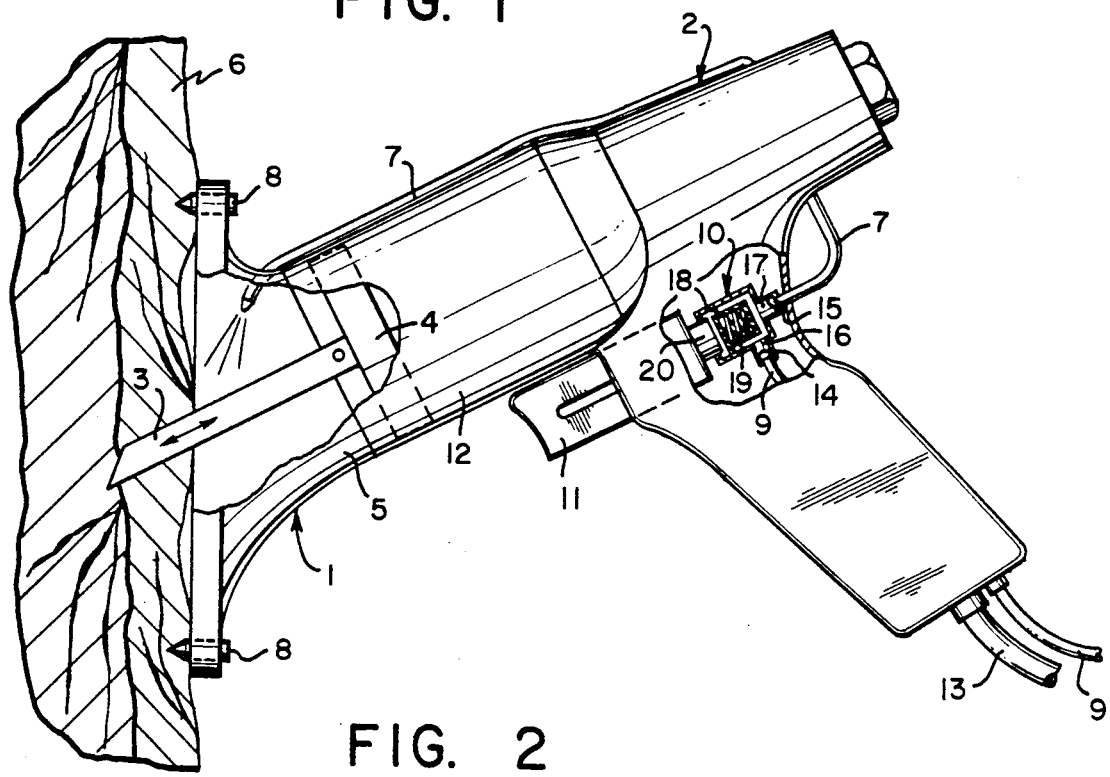
FIG. 1 shows a schematic view of a first embodiment of a tree injection attachment of the present invention, connected to a suitable fuel actuated piston type device.

In FIG. 1, is shown a first embodiment of the tree injection attachment of the present invention, connected to a suitable fuel actuated piston type device. The tree injection attachment, generally designated by the numeral 1, is connected by means of a screw thread expansion pin or the like, to the fuel actuated piston type device, shown in FIG. 1 in the form of a hand gun 2, such that a blade 3 is engaged, also by means of a screw thread or the like, to the piston 4. Forward and rearward movement of the piston 4 consequently moves the blade 3. The tree injection attachment housing 5 is shaped such that, in use, the blade 3 Pierces the tree, designated 6 at a suitable angle. The angle at which the blade 3 pierces the tree 6, together with the depth of penetration of the blade, is important for efficient operation of tree injection, as will be hereinafter detailed.

After piercing of the tree 6, a dosage of chemical is supplied to the cut via tube 7.

During the tree injection operation, it is quite important that the injected chemical is supplied to the tree at the correct angle and penetration, such that the tree can efficiently absorb the chemical. Firstly, the cut should be of such a shape and angle to prevent the injected chemical from running out. That is, the cut should be made at a substantially downwardly inclined angle, preferably from about 30° to 45° to the vertical direction of the tree trunk. Also, the depth of penetration of the cut should be such that the chemical is supplied to a suitable layer of the tree trunk such that the most efficient absorbtion of the chemical takes place. The present invention is hereinafter described with reference to a particular application of the tree injection attachment, wherein a tree killing chemical is supplied to the cambium layer of the tree. Such disclosed application should not however be considered to limit the scope of the present invention, since, the present invention may also be used to supply herbicides and other chemicals to various parts of a tree, for any purpose. Once the injected chemical is supplied to the appropriate layer of the tree trunk, then it is taken up by the tree and transported throughout the tree systematically.

The tree injection attachment 1 is therefor provided with a housing 5, designed to apply the blade 3 at an appropriate angle, such as to supply a cut in the tree trunk at the most preferably angle. The depth of penetration of the blade 3 is also preferably adjustably by the operator depending on the particular type and size of the tree. Due to the strong force required to pierce a cut in a tree, the housing 5 is provided with a plurality of spikes 8, such that the trunk of the tree is suitably engaged and remains engaged during the recoil effect of the operation. The spikes 8 may also be adjustable in length such as to serve the purpose of adjusting the depth of penetration of the blade 3.

The hand gun 2 is operated as described in the following brief description. The hand gun 2 essentially comprises an expansible chamber 12 with a removable piston 4 at the forward end thereof. Upon activation of a trigger 11, fuel is admitted into the expansible combustion chamber 12, via a fuel line 13. The fuel may be natural gas, liquid petroleum gas, or any other combustible fuel. After admission of the fuel into the chamber 12, an ignition means is activated, which ignites the fuel. Subsequent combustion of the fuel creates an elevated pressure, causing rapid momentary movement of the piston 4 in the forward direction, thus piercing the blade 3 into the tree 6. After explosion of the fuel, the piston 4 moves rearward and withdraws the blade from the cut in the tree.

The supply of the tree injection chemical within the cut produced by the blade 3, also forms an integral part of the present invention. The chemical is preferably housed in a container provided in a backpack which is carried by the operator A suitable backpack structure will be hereinafter described with reference to FIGS. 4 and 5.

The chemical is supplied from the container on the backpack structure to the hand gun 2 via a flexible hose 9. A chemical control unit 10 is simultaneous activation of the blade 3 and chemical injection is achieved by one simple operation. The control valve subsequently supplies the chemical via tube 7 to the cut made in the tree 6 by blade 3, as said blade 3 retracts. The chemical control unit 10, shown in FIG. 2, comprises a small spring loaded Plunger syringe type pump, and is provided with an inlet 14 to which the tube 9 is sealingly connected, and an outlet 15 to which the tube 7 is sealingly connected. Each of the inlet 14 and outlet 15 are provided with check valves 16 and 17 respectively, which check the direction of flow during filling and discharging of the control unit 10. The operation of the chemical control unit 10 is as follows. As the chamber 18 is expanded under operation of the spring 19 when the trigger is released, check valve 17 is closed and check valve 16 allows chemical to be drawn under pressure into the chamber 18 from the container via tube 9. After the desired dose of chemical is contained within the chamber 18, which is operator adjustable by altering the stroke of the plunger 20, the chemical control unit 10 is ready for supply of the chemical to the cut made in the tree. The plunger 20 of the chemical control unit 10 is connected to the trigger 11, such that upon depression of the trigger, the plunger 20 is moved rearwardly in the chamber 18, forcing the chemical past the check valve 17 in outlet 15, through the tube 7, and to the cut made by the blade 3 in the tree 6. Check valve 16 ensures that the chemical will not be directed back through the inlet valve 14. Upon release of the trigger 11, a further dosage of chemical is supplied to the chamber 18, as previously described, and the apparatus is ready for further activation.

The position of the chemical control unit 10 is shown in FIG. 1 as being located behind the trigger 11 of the hand gun 2. The functional purpose of this positioning of the unit 10 is such that one activation of the trigger 11 by an operator, initiates both the cutting operation of the blade 3 and the injection of the chemical by the unit 10 into a cut formed in the tree 6. This functional purpose can, however, be achieved with alternative placement of the unit 10. For instance, the unit 10 may be located within the housing 5 in such a position that a small protrusion on the blade could move the plunger to consequently dispense the dose of the chemical as the blade is moved backwards.

Figure 2:
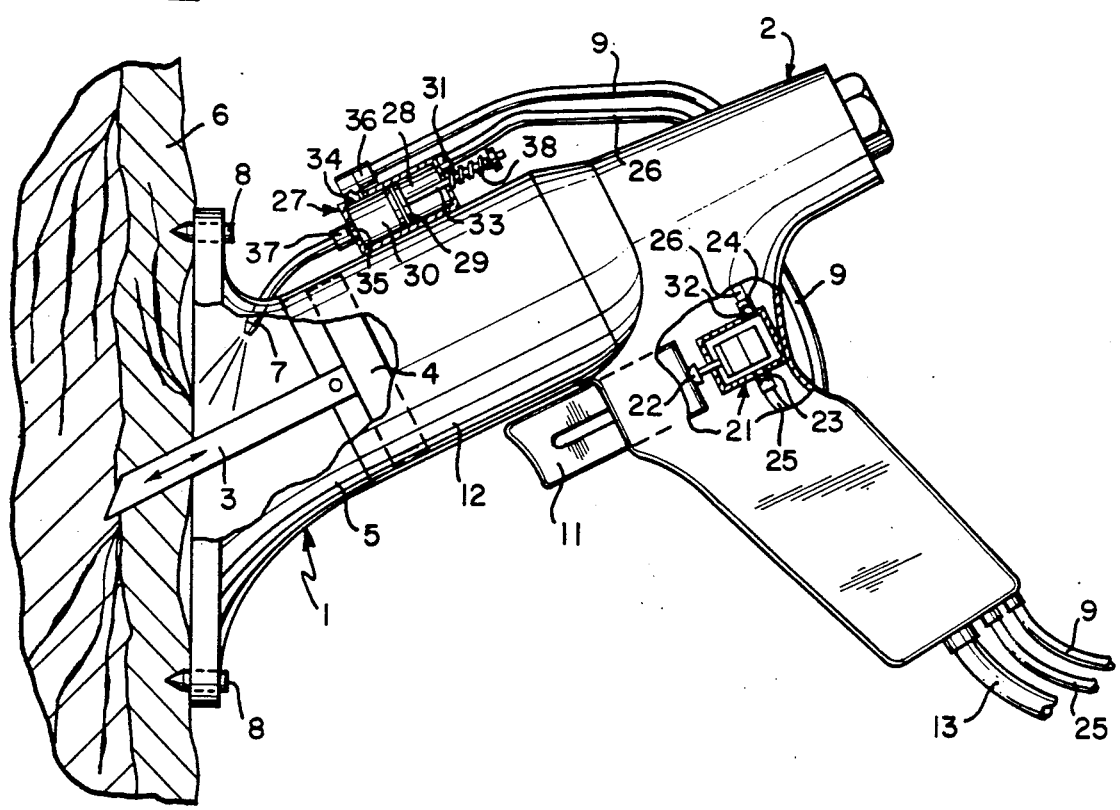
FIG. 2 shows a second embodiment of a tree injection attachment in which the chemical is applied to the cut in the tree by a fuel-actuated pneumatic device.

In FIG. 2 is shown a second embodiment of the present invention, wherein like numerals represent similar parts to those of FIG. 1 ? n this embodiment, the housing 5 containing the blade 3 is similar to that shown in FIG. 1, however the means by which the chemical is supplied to the cut in the tree is different. The embodiment of FIG. 2 comprises, a Pneumatic valve 21 located adjacent to and rearwardly of the trigger 11, and a cylinder 27 which is controlled by the pneumatic valve 21 to supply the chemical to the cut in the tree 6. The pneumatic valve 21 is connected to a source of power, for instance, a liquid petroleum gas tank via an appropriate regulating device. Such a liquid petroleum gas (LPG) source may be supplied in an appropriate backpack, carried by the operator, as will be described hereinafter with reference to FIGS. 4 and 5 This LPG source may be the same as that used to power hand gun 2 as previously described. The pneumatic valve 21 is provided with its own trigger 22, actuated by association with trigger 11, an inlet 23 connected to tube 25, a port 24 connected to tube 26 and an outlet 32. The tube 25 is connected to the LPG regulator, and the tube 26 is connected to a first chamber 28 of the cylinder 27. Upon activation of the trigger 22, which may be adjusted to alter the timing of the dispensation of the chemical in relation to the movement of the blade 3, LPG is drawn by the valve 21 into the first chamber 28 of the cylinder 27 The cylinder 27 is provided with a movable piston 29, which separates the cylinder 27 into two expansible chambers 28 and 30. The first chamber 28 is provided with a Port 31 to which the pneumatic control valve 21 is connected via tube 26, and through which, LPG is drawn and expelled depending on the activation of said control valve 21. The piston 29 is provided with a rod 33 which extends through the wall of the first chamber 28 and which carries an adjustable stop to restrict its stroke to consequently adjust the dose of the chemical to be dispensed. The rod 33 also has a spring 38 which normally biases the rod 33 in the rearward position.

The second chamber 30 is provided with an inlet 34 and an outlet 35, each provided with check valves 36 and 37 and connected to tubes 9 and 7, respectively. When the trigger 22 is actuated, and the piston 29 is moved forward against the bias of spring 38 by the introduction of LPG into the first chamber 28, the chemical contained within the second chamber 30 is forced out through the outlet 35, through tube 7 and into the cut formed by the blade 3. Check valve 37 allows the passage of the chemical, whilst check valve 36 ensures that no chemical will flow into tube 9. When the trigger 11 of the hand gun 2 is released, trigger 22 is also deactivated, the LPG in the first chamber 28 is released to atmosphere via port 31 into tube 26 and via valve 21 through outlet 32. Upon release of LPG from the chamber 28, the piston 29 is moved rearwardly in cylinder 27 under bias of the spring 38. This rearward movement of piston 29 creates a suctional pressure in the second chamber which draws another dosage of chemical via tube 9 and check valve 36 into the chamber 30, ready for the next dosing operation.

Figure 3:
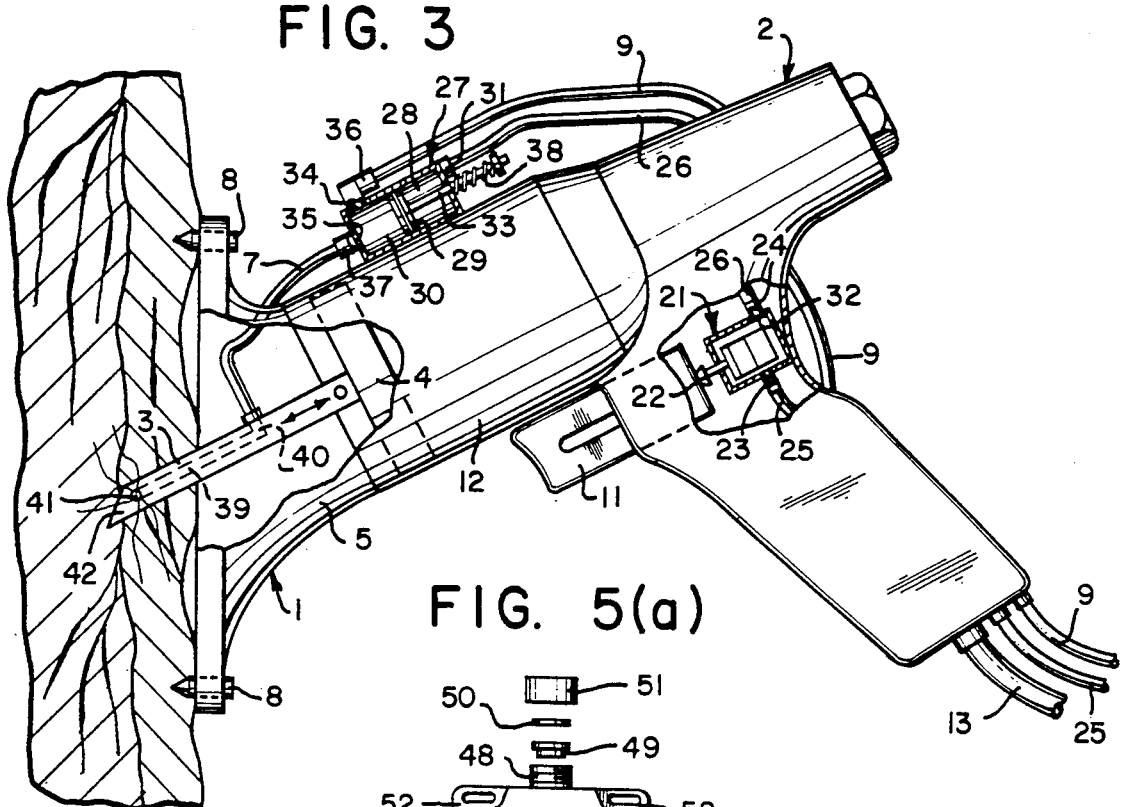
FIG. 3 illustrates a schematic view of a preferred blade construction, in which the blade is provided with a hole therethrough such that the chemical is supplied to the cut at the tip of the blade.

In FIG. 3 is detailed a more preferred embodiment of the tree injection attachment of FIGS. 1 and 2. The difference in this embodiment of the present invention lies essentially in the method by which the chemical is applied to the cut in the tree 6. The chemical is supplied to the tube 7 in the same manner as shown in FIG. 2 In the embodiment of FIG. 3, the tube 7 is connected to one end 40 of a hole 39 bored through the blade 3 via means of a hose barb or the like. The chemical passes through hole 39 and is emitted through the orifice 41 provided at substantially the end of blade 3. The chemical is therefore supplied to the desired position, that is, directly into the sap stream of the tree. Preferably, the orifice 41 allows multi-directional distribution of the chemical. The end 42 of the blade 3 is designed differently for varying tree types, such that the orifice 41 does not become blocked by timber and bark fragments. The design of the tip 42 of the blade 3 obviously depends on the tree type, for instance on the hardness and thickness of the bark. For example, porous metal inserts may be incorporated in the tip 42 of the blade 3 such that the chemical may be released therethrough. For a hairy-barked species, the blade 3 is designed to act in such a direction so as to cut between the fibres rather than across the fibres, thus allowing better penetration.

A further feature may also be provided in connection with the tree injection attachment of the present invention to ensure that an efficient dosing operation is achieved During such a tree injection operation, it is often difficult to ascertain whether a particular tree has previously been dosed. To obviate this problem, a dye dispensing unit may also be provided such that, as each tree is treated, a mark is applied to the tree. Such a dye dispensing unit may be LPG operated, similar in embodiment to unit 27 of FIG. 2 and connected to trigger valve 21 to ensure that it is actuacted simultaneously with the injection operation. The dye is directed onto the bark of each tree above the cut, such that treated trees are clearly highlighted.

Figure 4:
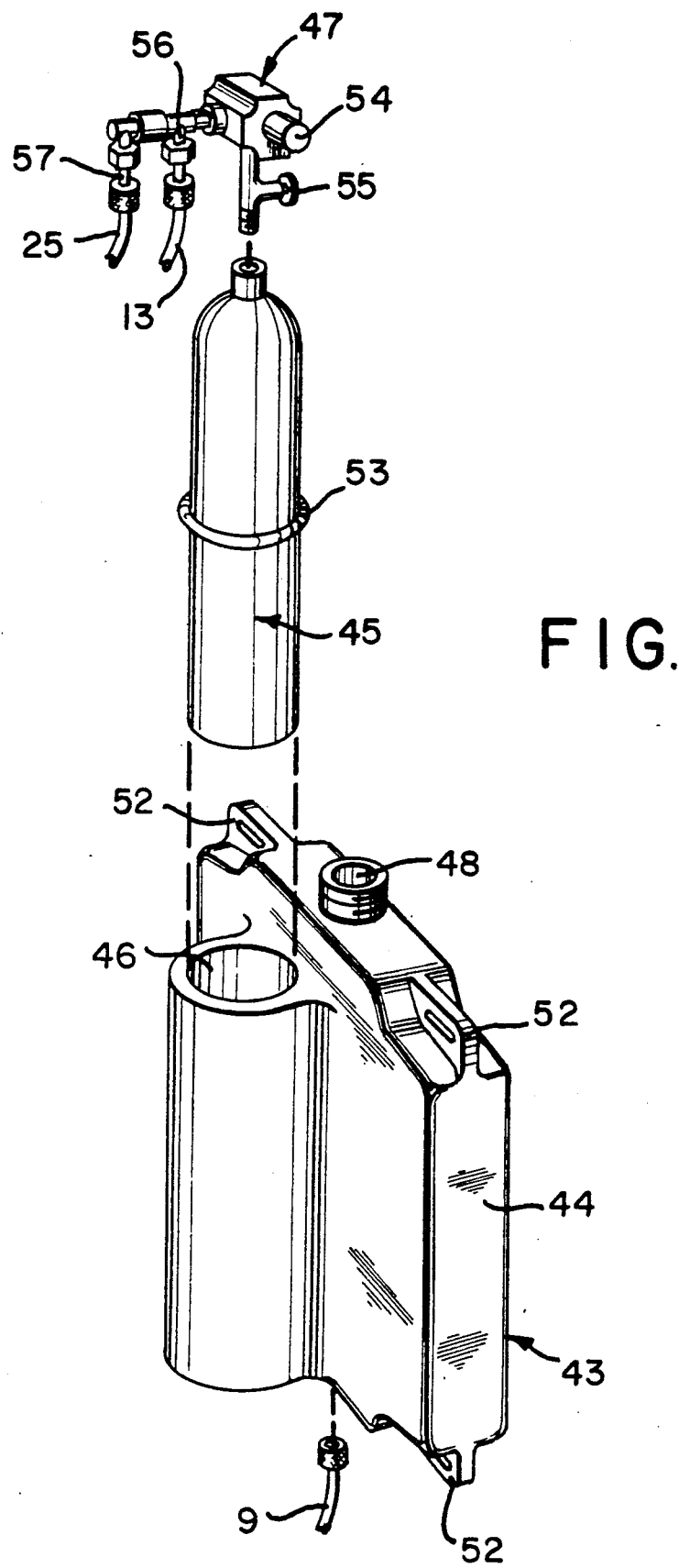
FIG. 4 shows an exploded perspective view of various components of a backpack structure which is preferably utilised in conjunction with the tree injection attachment of the present invention.

In FIG. 4 is shown the various components of a backpack structure which is preferably used with the tree injection attachment of the present invention. A single backpack 43 is provided with a chemical tank 44 and a cylinder 45 which is placed in the pouch 46 moulded in the backpack 43. An adjustable pressure regulator 47 is used such that the pressure of the gas, preferably LPG, may be adjusted, supplying LPG to tube 13 of the hand gun 2, and also to tube 25 of the pneumatic valve 21 when chemical is to be supplied automatic to the tree with the aid of the pneumatic power. The chemical is placed in the chemical tank 44 through chemical inlet 48 and is supplied to the hand gun 2 via tube 9.

Figure 5A:
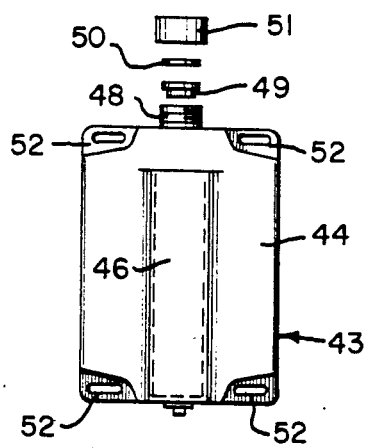
FIGS. 5a, 5b and 5c shows an exploded plan view of a backpack of FIG. 4.
Figure 5B:
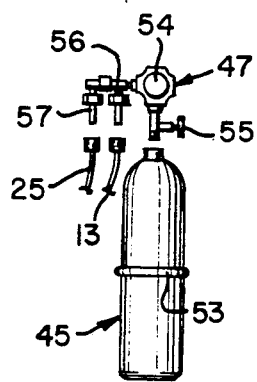
Figure 5C:
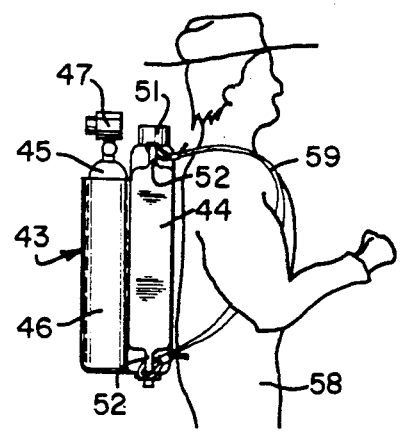

In FIG. 5, is detailed some of the essential components of a backpack structure as shown in FIG. 4. FIG. 5(a) shows a front view of the backpack 43 of FIG. 4. The backpack, moulded of lightweight plastics material, is provided with four strap connection means 52 the chemical tank 44 is provided at its upper end with the chemical inlet 48, a plastic baffle 49, a venting valve 50 and a cap 51. The lower end of the chemical tank 44 is provided with a threaded insert which connects to the tube 9. FIG. 5(b) details the LPG cylinder 45 which is placed in the pouch 46. An 0-ring 53 keeps the cylinder 45 firmly inside the pouch 46. The pressure regulator 47 is provided with a lock screw 54, an on-off tap 55, and an outlet 56 which is connected to tube 13 of the hand gun, providing fuel for the combustion chamber 12. If the chemical is supplied to the cut of the tree 6 with power assistance of LPG as shown if FIGS. 2 and 3, a further outlet 57 is connected tube 25. FIG. 5(c) shows how the backpack structure 43 is carried by an operator 58. Straps 59 are connected to the connectors 52 each side of the backpack structure. The provision of the chemical tank 44 and the LPG cylinder 45 in such a backpack structure provides for easy use of the tree injection apparatus of the present invention by allowing the hand gun to be carried in one of the operators hands, leaving the other hand free.

The present invention has been herein described with reference to particular embodiments of a tree dosing attachment and apparatus. Each of the hereinabove described embodiments has been described, specifically relating to a tree injection attachment which is adapted to a hand gun. It should however be considered that there are other variations and modifications of apparatuses for achieving the tree injection operation of the present invention are also possible. For instance, it should be considered as an obvious modification of the present invention to incorporate a control valve in a conventional -type axe handle. An operator would swing the axe, making a cut in a tree, and then activate the control valve, which could either be incorporated in the axe handle or be hand held. The control valve then supplies LPG to a dispensing unit which, would in turn, inject the chemical into the tree via a tubing system contained within the specially designed axe handle and head. A further variation may also be made to the present invention. A second dispensing unit could also be incorporated into the axe, which simultaneously squirts paint onto the bark of the tree, identifying that the tree had been treated.

It should be considered that the above mentioned and other variations and modifications can be made to the tree injection apparatus without departing from the overall spirit and scope of the present invention.

I claim:

1. A tree dosing apparatus, comprising:

a pistol-like hand gun which includes an internal combustion chamber slidably receiving a piston, a blade attached to said piston, a trigger movable between a depressed position and a non-depressed position, an ignitor located in said internal chamber, means responsive to said trigger being moved into said depressed position for admitting fuel into said combustion chamber and for thereafter activating said ignitor which results in combustion in said internal combustion chamber, said piston and therefore said blade moving in a predetermined direction away from said internal combustion chamber in response to said combustion taking place; and a housing with one end attached to said gun, said housing surrounding said blade and providing an opening through which passes said blade in response to said piston moving in said predetermined direction, said housing having an inclined surface defining said opening, said blade moving in response to said combustion from a retracted position with respect to said inclined surface to a projected position with respect to said inclined surface, said inclined surface being inclined so that said blade forms an oblique angle with respect to said inclined surface when said blade is in said projected position.

2. The apparatus as in claim 1, further comprising at least one adjustable length spike which extends through said inclined surface at a location spaced away from said opening.

3. The apparatus as in claim 1, wherein the trigger, when in the depressed position, engages with a plunger of a fluid injector, the injector having a fluid outlet and a fluid inlet with the plunger located between said fluid outlet and said fluid inlet, the plunger resiliently biasing toward the fluid inlet, the plunger movable away from said opening in response to depression of the trigger toward the fluid outlet in the fluid injector, the fluid inlet and outlet each having adjacent check valves for providing one-way flow through the injector; the fluid outlet being connected to a delivery tube which terminates inside the housing.

4. The apparatus as in claim 1, further comprising a pneumatic valve which is operable in response to depression of the trigger, the pneumatic valve being supplied with a pressurized gas from a source external to the gun, said source being operable for supplying the pressurized gas to a cylinder of an injector, the cylinder having therein a resiliently biased piston, a fluid inlet and a fluid outlet, the inlet receiving a supply tube from a source of liquid external to the gun, the outlet connected to a delivery tube which terminates inside the housing, the inlet and outlet each having adjacent check valves for providing one-way fluid flow through the injector.

5. The apparatus as in claim 1, wherein the blade further comprises a central longitudinal opening with one end the forming a delivery orifice at the tip of the blade and with the other end communicating with a transverse bore, the transverse bore terminating at an exterior surface of the blade; and a fitting attached to said transverse bore and which receives the delivery tube.

6. The apparatus as in claim 1, further comprising:

means for spraying liquid dye in proximity to the blade in response to the trigger being in the depressed position.

7. The apparatus as in claim 5, further comprising:

means for spraying liquid dye in proximity to the blade in response to the trigger being in the depressed position.

8. The apparatus as in claim 4, wherein the source provides the fuel which is admitted into the combustion chamber, the fuel being the same substance which is supplied to the pneumatic valve.

9. The apparatus as in claim 3, further comprising:

a backpack which removably receives a container for the fuel, the fuel container connected to the gas valve by a flexible hose, the backpack also removably receiving a container for the liquid which is supplied to the fluid inlet of the injector and which is connected to the fluid inlet of the injector by a second flexible hose.

10. The apparatus as in claim 4, further comprising:

a backpack which removably receives a container for the fuel, the fuel container connected tot he gas valve by a flexible hose, the backpack also removably receiving a container for the liquid which is supplied to the fluid inlet of the injector and which is connected to the fluid inlet of the injector by a second flexible hose.

11. A tree dosing apparatus comprising:

an elongated housing;

a blade movably attached to one end of said housing;

trigger means located on said housing, said blade being movable relative to said housing in response to said trigger means so as to be movable outward in a direction away from said housing and into embedment of a tree;

a fluid orifice located in said blade;

a fluid dispenser; and a fluid passage connected from the fluid orifice to said fluid dispenser, the fluid dispenser dispensing fluid through the orifice in response to actuation of the trigger means when the blade is embedded in the tree.

12. A tree dosing apparatus as claimed in claim 11, further comprising:

a dye orifice located on the blade;

a dye passage located in said handle communicating with the dye orifice; and a dye dispenser connected to the dye passage, said dye dispensing means supplying a dye through the dye passage through the dye orifice onto said tree in response to the activation of said trigger means.

13. The apparatus as in claim 1, wherein said blade forms an angle from 30° to 45° with respect to said inclined surface when in said projected position.

* * * * *